United States Patent
Bond et al.

[19]

[11] Patent Number: 5,889,688
[45] Date of Patent: Mar. 30, 1999

[54] FREQUENCY DOMAIN KERNEL PHASE PROCESSOR

[75] Inventors: James W. Bond, San Diego; Stefen Hui, Spring Valley; David Stein; James Zeidler, both of San Diego, all of Calif.

[73] Assignee: United States of America as represented by the Secretary of the Navy, Washington D.C.

[21] Appl. No.: 941,816

[22] Filed: Sep. 30, 1997

[51] Int. Cl.$^6$ .............................. G06F 15/00; G06F 17/10
[52] U.S. Cl. ................... 364/726.01; 364/724.18
[58] Field of Search ......................... 364/726.01, 726.03, 364/725.01, 724.18

[56] References Cited

U.S. PATENT DOCUMENTS

| | | |
|---|---|---|
| 3,918,055 | 11/1975 | Shimizu et al. . |
| 4,287,475 | 9/1981 | Eaton et al. . |
| 4,480,236 | 10/1984 | Harris . |
| 4,613,978 | 9/1986 | Kurth et al. . |
| 5,018,088 | 5/1991 | Higbie . |
| 5,272,446 | 12/1993 | Chalmers et al. ................. 364/726.02 |
| 5,309,378 | 5/1994 | Beierle . |
| 5,357,256 | 10/1994 | Peperone . |
| 5,363,401 | 11/1994 | Lucas et al. . |
| 5,473,555 | 12/1995 | Potter ................................. 364/724.18 |
| 5,481,503 | 1/1996 | Kuhn et al. . |
| 5,485,157 | 1/1996 | Long . |

FOREIGN PATENT DOCUMENTS 3332614  3/1985  Germany .

*Primary Examiner*—Tan V. Mai
*Attorney, Agent, or Firm*—Harvey Fendelman; Michael A. Kagan; Eric James Whitesell

[57] ABSTRACT

A frequency domain kernel phase processor comprises an input buffer to store Fourier coefficients input from a Fourier transform of a communications signal. A communications signal suitable for processing by the present invention typically comprises a desired signal masked by a stronger interference signal having varying power that spans a range of frequency bins encompassing the desired signal. A scheduler inputs Fourier transform coefficients from the input buffer and generates a series of magnitude squares and symmetric phase differences for each frequency bin. The magnitude squares and the symmetric phase differences are output to phase transform processors which transform the symmetric phase differences to reveal the desired signal. The transformed outputs from the phase transform processors are output to an output buffer to be formatted and displayed.

5 Claims, 7 Drawing Sheets

FREQUENCY DOMAIN KERNEL PHASE PROCESSOR

LICENSING INFORMATION

The invention described below is assigned to the United States Government and is available for licensing commercially. Technical and licensing inquiries may be directed to Harvey Fendelman, Legal Counsel For Patents, NCCOSC RDTE DIV CODE 0012, 53510 Silvergate Avenue Room 103, San Diego, Calif. 92152-5765; telephone no. (619)553-3818; fax no. (619)553-3821.

BACKGROUND OF THE INVENTION

The frequency domain kernel phase processor of the present invention relates generally to enhancing the signal-to-noise ratio of communication signals. More particularly, the present invention relates to detecting weak signals in the presence of interfering narrowband signals having a phase linearity that varies with time.

Electrical signals having sharp spectral features have traditionally been detected by signal processors exemplified by the block diagram of FIG. 1. A sensor 102 outputs an electrical signal representative of the desired signal typically masked by interfering signals. An A/D converter 104 digitizes the electrical signal and outputs a data stream to Fourier transform 106. Format processor 108 averages the Fourier coefficients generated by Fourier transform 108 and displays the average power over time per frequency bin on display 110. If the desired signal is masked by interfering signals spanning the frequencies of the desired signal, however, the spectral characteristics of the desired signal may not be apparent. A continuing need exists for a signal processor that can display weaker signals masked by stronger interfering signals.

SUMMARY OF THE INVENTION

The frequency domain kernel phase processor of the present invention addresses the problems described above and may provide further related advantages.

The frequency domain kernel phase processor of the present invention comprises an input buffer to store Fourier coefficients input from a Fourier transform of a communications signal. A communications signal suitable for processing by the present invention typically comprises a desired signal masked by a stronger interference signal having varying power that spans a range of frequency bins encompassing the desired signal. A scheduler inputs Fourier transform coefficients from the input buffer and generates a series of magnitude squares and symmetric phase differences for each frequency bin. The magnitude squares and the symmetric phase differences are output to phase transform processors which transform the symmetric phase differences to reveal the desired signal. The transformed outputs from the phase transform processors are output to an output buffer to be formatted and displayed.

Other objects, advantages and new features of the invention will become apparent from the following detailed description of the invention when considered in conjunction with the accompanying drawings.

DESCRIPTION OF THE INVENTION

A frequency domain kernel phase processor of the present invention may be used with a sensor having an electrical output signal that includes a signal of interest having strong spectral features. A Fourier transform of the sensor signal preferably has a resolution matched to the bandwidth of the signal of interest so that the signal of interest contributes to two adjacent frequency bins, while strong interfering signals should be broader so as to contribute to at least four adjacent frequency bins including those encompassing the signal of interest. The interfering signals should also have substantially linear phase. An example of an interfering signal to which the present invention applies is a narrowband interfering signal varying slowly in frequency among four or more adjacent frequency bins that include the signal of interest.

Figure 1:
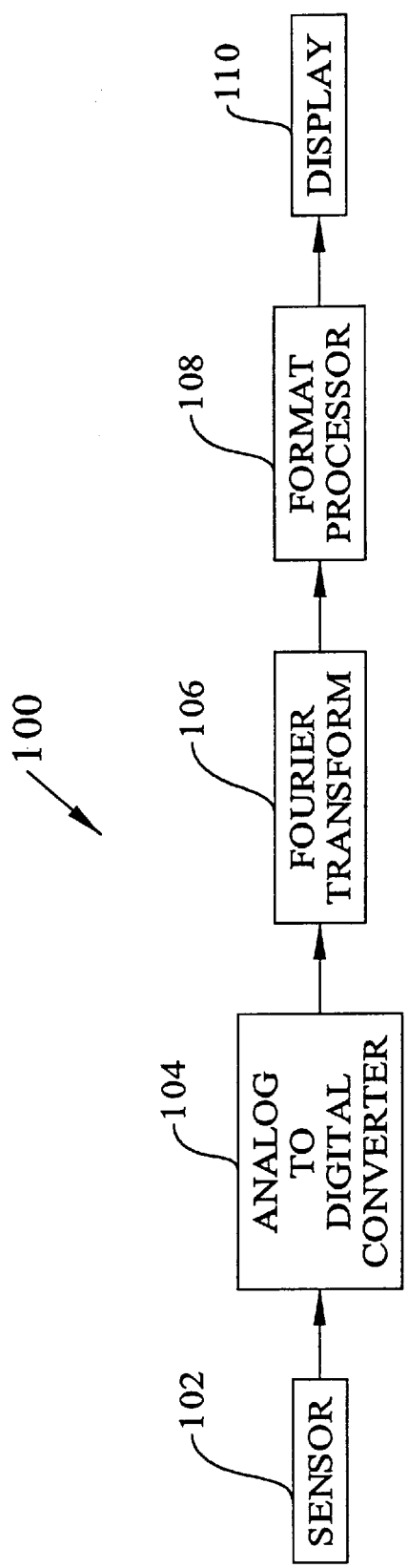
FIG. 1 is a block diagram of a signal processing system of the prior art.
Figure 2:
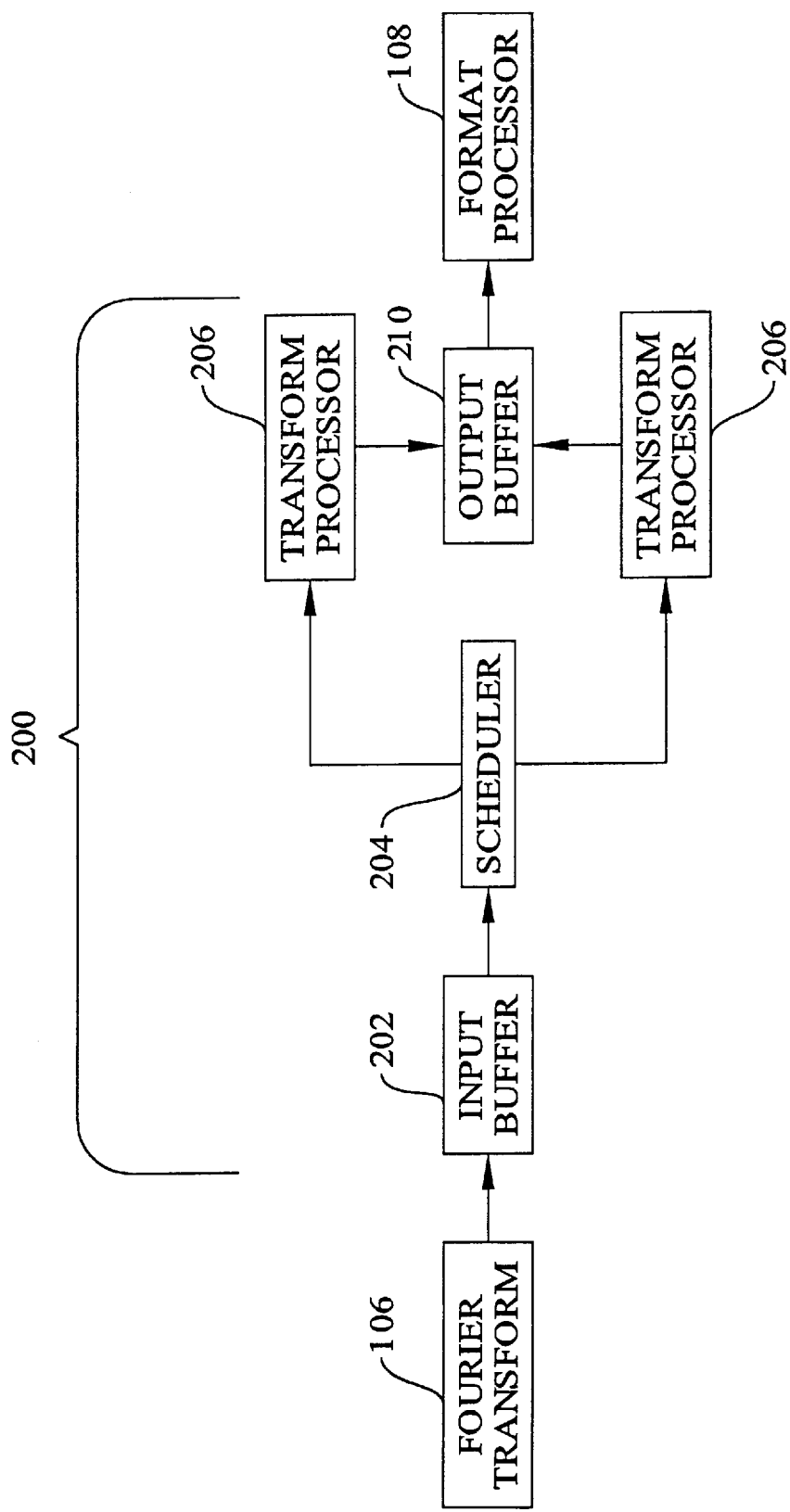
FIG. 2 is a block diagram of the frequency domain kernel phase processor of the present invention.

FIG. 2 is a block diagram of an embodiment of a frequency domain kernel phase processor 200 inserted into signal processing system 100 of FIG. 1 between Fourier transform 106 and format processor 108. Because frequency domain kernel phase processor 200 introduces a delay, a delay compensator (not shown) may be added to signal processing system 100 to compare typically processed signals with the output of the present invention within the same signal time interval. Frequency domain kernel processor 200 comprises an input buffer 202, a scheduler 204, two phase transform processors 206, and an output buffer 210. Input buffer 202 inputs blocks of Fourier coefficients of a frequency transform of a communications signal.

Figure 3:
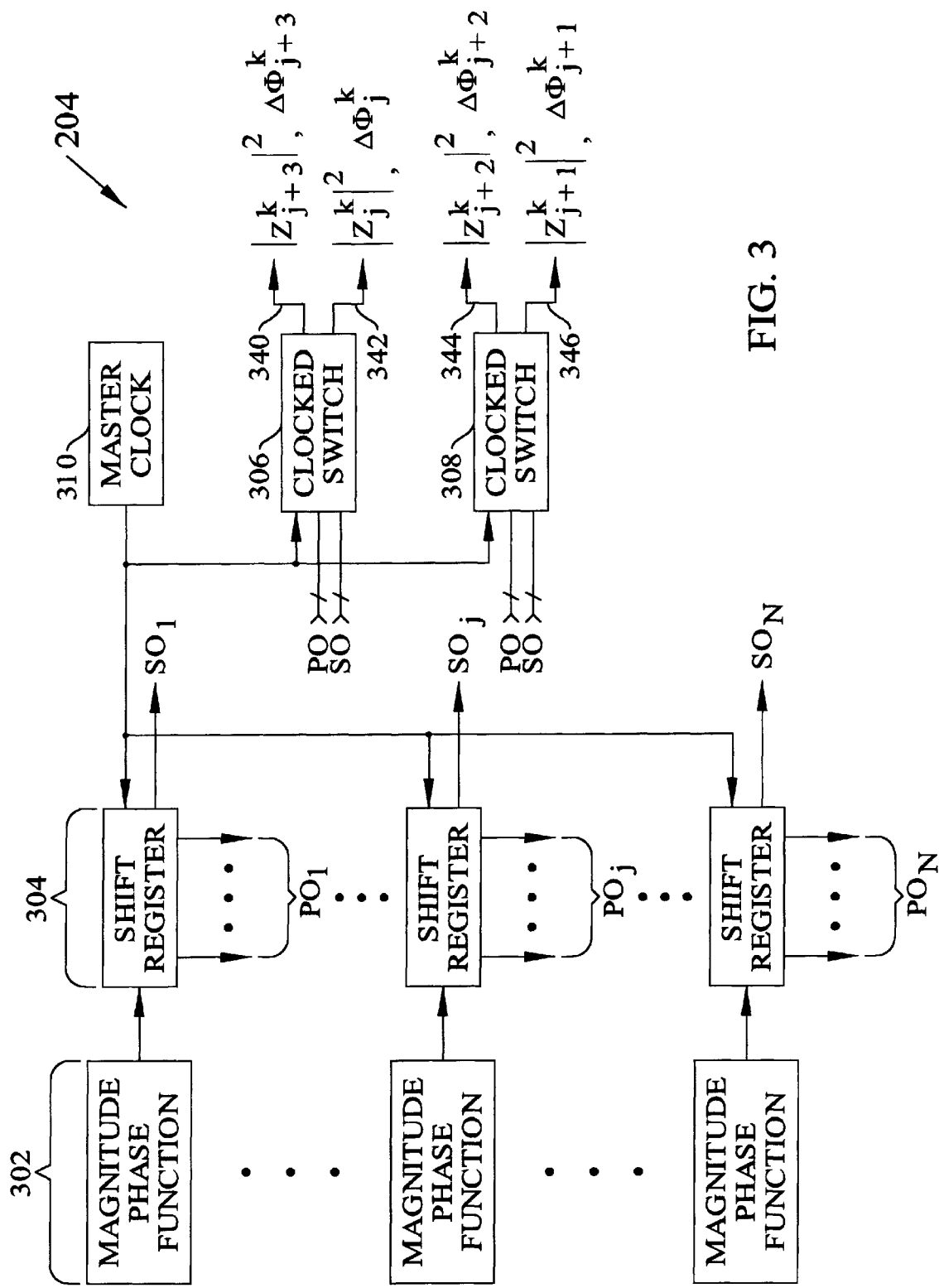
FIG. 3 is a detailed diagram of a scheduler of the frequency domain kernel phase processor.
Figure 4:
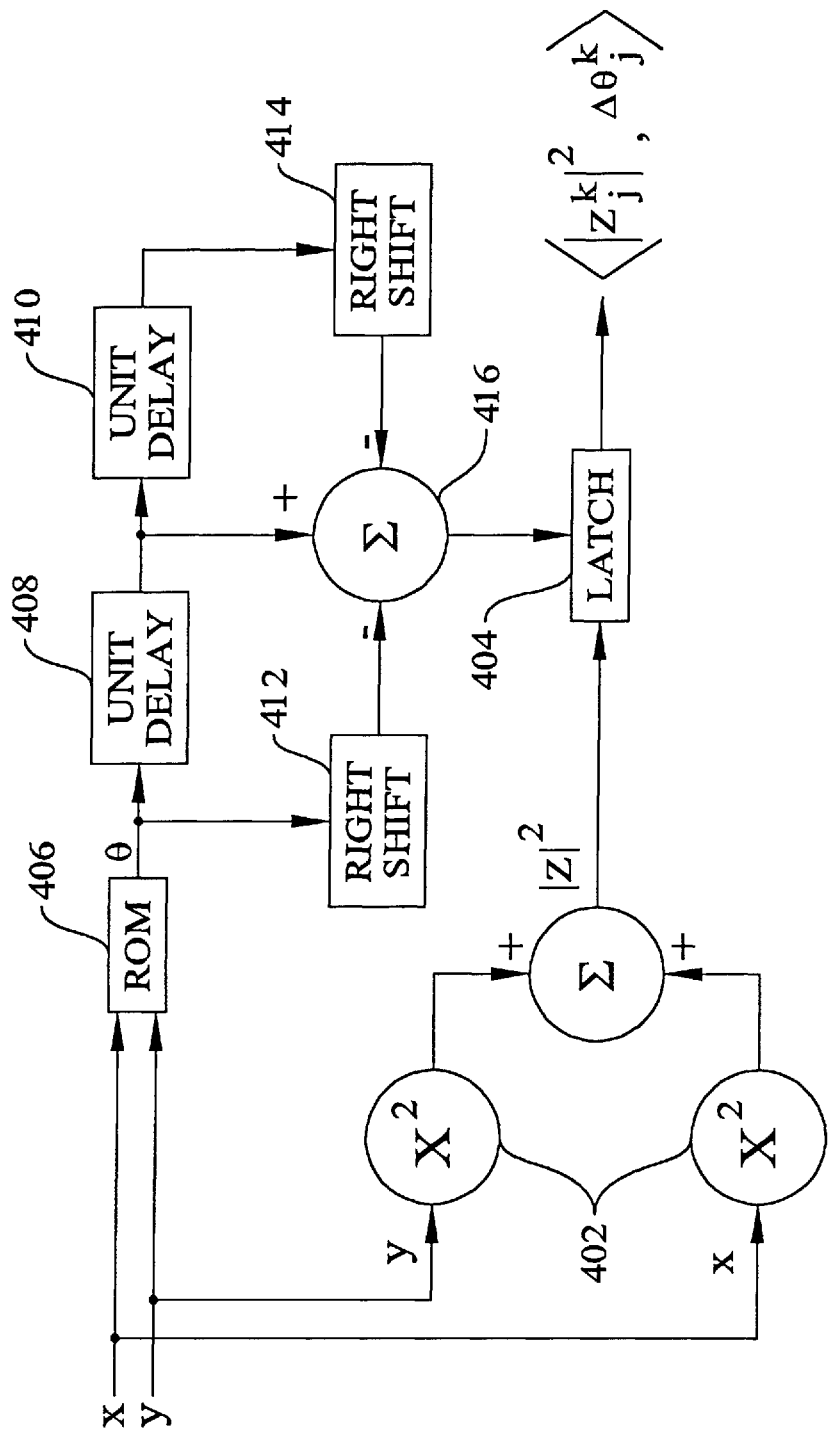
FIG. 4 is a diagram of a magnitude-phase function.

FIG. 3 shows the detailed structure of scheduler 204. Magnitude phase functions 302 output the squared magnitudes of the Fourier coefficients and the phase difference of each frequency bin to shift registers 304. FIG. 4 is a diagram of an exemplary magntitude phase function 302. Real and imaginary parts x and y for each frequency bin from Fourier transform 106 are input respectively to squaring functions 402 and ROM 406. A sum function 404 adds the squares of the real and imaginary parts. The summed squared magnitudes are loaded into latch 404. ROM 406 functions as a lookup table for address inputs x and y and outputs a phase angle $\theta$ where $-\pi < \theta \leq \pi$ for which $x+iy=(\sqrt{x^2+y^2})e^{-j\Theta}$. Unit delays 408 and 410, right shift functions 412 and 414, and sum function 416 output the symmetric phase difference function $\Delta\theta_j^k = \theta_j^k - \frac{1}{2}(\theta_{j-1}^k + \theta_{j+1}^k)$ where j is a time index and k is a frequency bin. The symmetric phase difference $\Delta\theta_j^k$ is latched with the squared magnitude squared $|Z_j^k|^2$ into latch 404 as an ordered pair. The contents of latch 404 are input to shift registers 304 in FIG. 3.

In FIG. 3 interference clocked switch 306 selects the contents of two shift registers 304 in the sequence 1 and 4, 2 and 5, . . . , j and (j+3), N−3 and N, while signal clocked switch 308 selects the contents of two shift registers 304 in the sequence 2 and 3, 3 and 4, . . . , (j+1) and (j+2), (N−2) and (N−1). Clocked switches 306 and 308 are controlled by a master clock 310 to select serial outputs SO from two shift registers 304 in a cycle ranging from the earliest squared magnitude to the latest in the frequency bins of the signal of interest and parallel outputs PO for modeling the interference. The serial and parallel shift register outputs selected by clocked switches 306 and 308 are output to phase transform processors 206 in FIG. 2.

Figure 5:
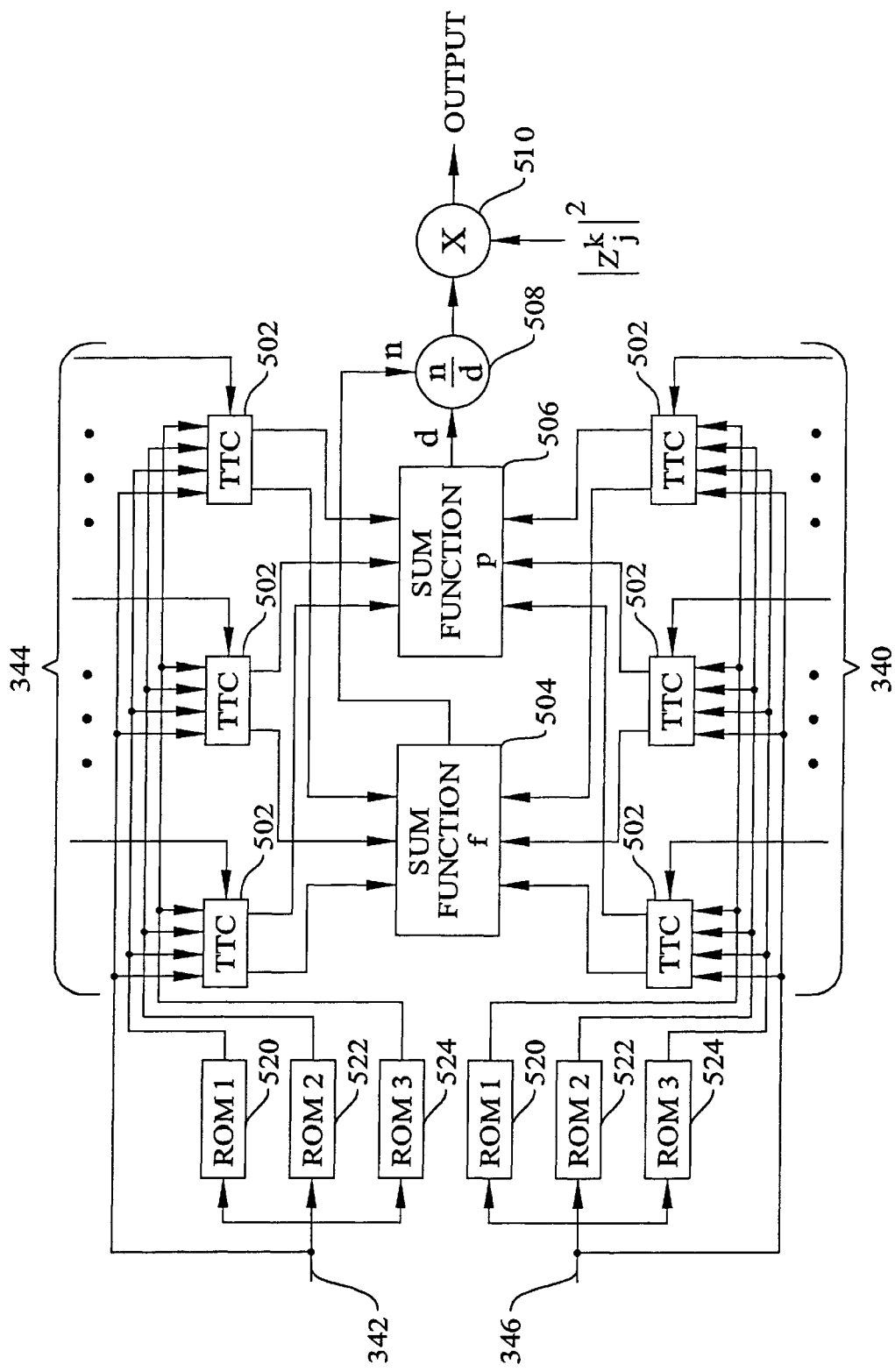
FIG. 5 is a detailed diagram of a phase transform processor of the the frequency domain kernel phase processor.

FIG. 5 shows the detailed structure of phase transform processors 206. Each of phase transform processors 206 comprises ROM 1 functions 520, ROM 2 functions 522, ROM 3 functions 524, transform term calculators 502, summing functions 504 and 506, divider 508, and multiplier 510. Each phase transform processor 206 has a parallel architecture to calculate the transform of the Fourier transform coefficient symmetric phase differences. The phase transform is used to reveal the signal of interest that is being masked by narrowband interference. Identical phase transform processors 206 transform $\Delta\theta_j^k$ and $\Delta\theta_j^{k+1}$ from scheduling processor parallel outputs 340 and 344 respectively in FIG. 3.

Phase differences in interfering signals may be modeled as having a symmetric phase difference of zero with linear phase, a mean of $-\pi/2$ with non-linear phase, and a mean of $\pi/2$ with non-linear phase. The variance of the samples in each state may be estimated by $\pi/4$. ROM 1 functions 520, ROM 2 functions 522, and ROM 3 functions 524 are used to find $$e^{-\frac{(\Delta\theta_j+\frac{\pi}{2})^2}{\frac{\pi^2}{4}}}, e^{-\frac{(\Delta\theta_j)^2}{\frac{\pi^2}{4}}}, \text{ and } e^{-\frac{(\Delta\theta_j-\frac{\pi}{2})^2}{\frac{\pi^2}{4}}}$$

respectively for transforming the phase to reveal the target signal. The outputs of ROM 1 functions 520, 522, and 524 along with normalized squared magnitudes $|Z_j^k|^2$ are output to transform term calculators (TTC).

Figure 6:
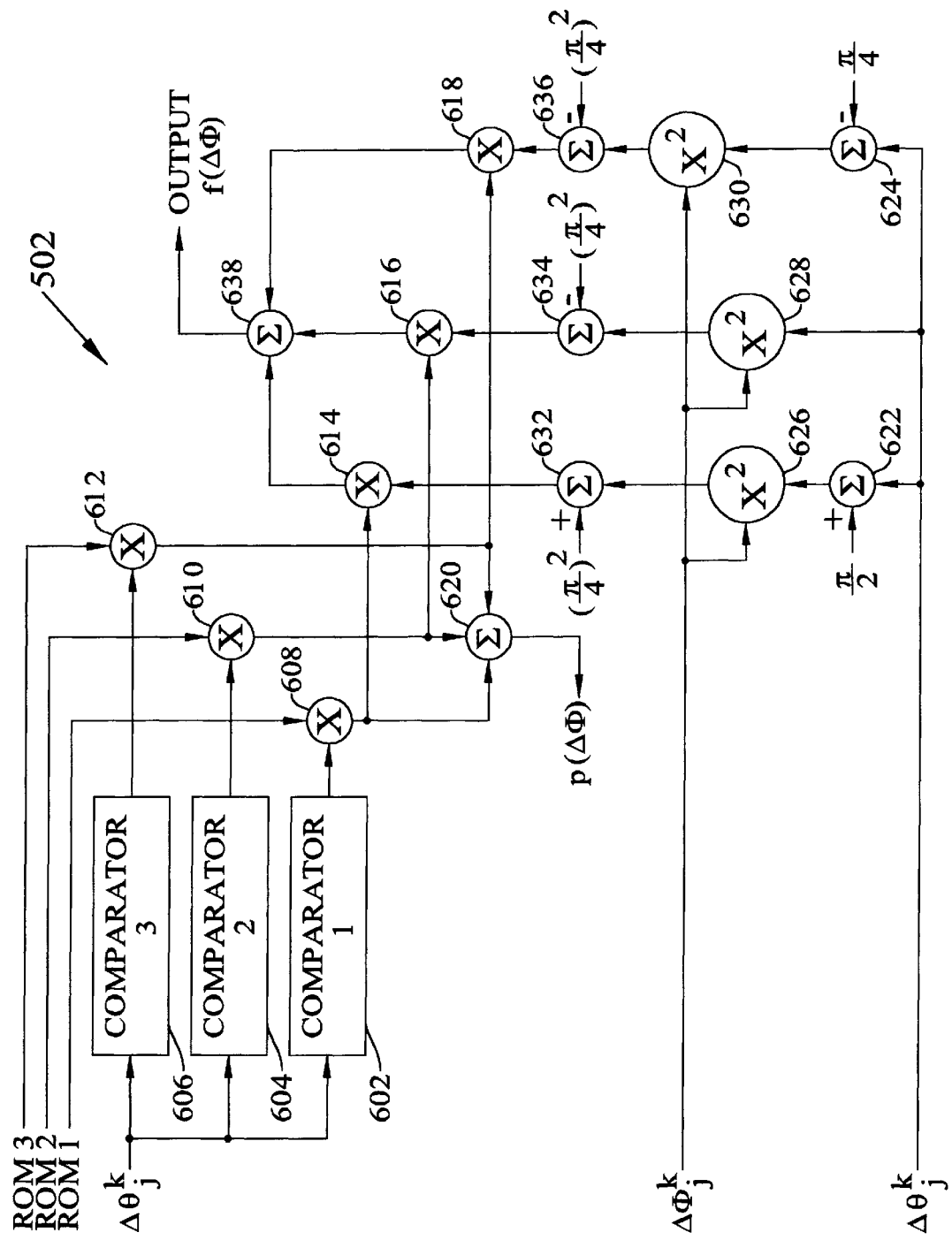
FIG. 6 is a detailed diagram of a transform term function of the phase transform processor.

FIG. 6 is a diagram of a transform term calculator 502. Comparators 602, 604 and 606 output a value of 1 respectively for hypothetical phase term difference $\Delta\theta$ for a narrowband signal of interest where $-\pi \leq \Delta\phi < \pi/4$, $\leq \Delta\phi \leq \pi/4$, or $\pi/4 < \Delta\phi \leq \pi$, otherwise a value of zero. ROM multipliers 608, 610 and 612 multiply the outputs of comparators 602, 604 and 606 by the outputs of ROM 1, ROM 2 and ROM 3 functions respectively. The outputs of multipliers 608, 610 and 612 are input to phase difference multipliers 614, 616 and 618 respectively and to p-sum function 620. p-sum function 620 outputs TTC output $p(\Delta\theta)$.

Complementary sum functions 622 and 624 add the $\Delta\theta$ values with $\pi/2$ and $-\pi/2$ respectively. State multipliers 626, 628 and 630 multiply the output of sum function 622, $\Delta\theta$ and the output of sum function 624 respectively by $\Delta\phi$. Angle sum functions 632, 634 and 636 subtract $(\pi/4)^2$ from the outputs of multipliers 626, 628 and 630 respectively. Angle multipliers 614, 616 and 618 multiply the outputs of ROM multipliers 608, 610 and 612 by the outputs of angle sum functions 632, 634 and 636 respectively. F-sum function 638 adds the outputs of angle multipliers 614, 616 and 618 to form TTC output $f(\Delta\phi)$.

The calculations described above for each of transform term calculators 502 may be described by the functions $$f(\Delta\phi,\Delta\theta) = \left[\left(\Delta\theta+\frac{\pi}{2}\right)^2 - \left(\frac{\pi}{4}\right)^2\right]p_1(\Delta\phi) +$$

-continued
$$\left[(\Delta\theta)^2 - \left(\frac{\pi}{4}\right)^2\right]p_2(\Delta\phi) +$$

$$\left[\left(\Delta\theta-\frac{\pi}{2}\right)^2 - \left(\frac{\pi}{4}\right)^2\right]p_3(\Delta\phi)$$

where $$p_1(\Delta\phi) = e^{-\frac{(\Delta\theta_j+\frac{\pi}{2})^2}{\frac{\pi^2}{4}}} e_1(\Delta\phi)$$

$$p_2(\Delta\phi) = e^{-\frac{(\Delta\theta_j)^2}{\frac{\pi^2}{4}}} e_2(\Delta\phi)$$

$$p_3(\Delta\phi) = e^{-\frac{(\Delta\theta_j-\frac{\pi}{2})^2}{\frac{\pi^2}{4}}} e_3(\Delta\phi)$$

and $$e_1(\Delta\phi) = \begin{cases} 1 & \text{if } -\pi \leq \Delta\phi < -\frac{\pi}{4} \\ 0 & \text{otherwise} \end{cases}$$

$$e_2(\Delta\phi) = \begin{cases} 1 & \text{if } -\frac{\pi}{4} \leq \Delta\phi \leq \frac{\pi}{4} \\ 0 & \text{otherwise} \end{cases}$$

$$e_3(\Delta\phi) = \begin{cases} 1 & \text{if } \frac{\pi}{4} < \Delta\phi \leq \pi \\ 0 & \text{otherwise} \end{cases}$$

The outputs f and p from all TTC's 502 are summed by summing functions 504 and 506 respectively. Output divider 508 divides the output of summing function 504 by the output of summing function 506. Output multiplier 510 multiplies the output of output divider 508 by the normalized squared magnitudes $|Z_j^k|^2$ to produce the output signal of each transform processor 206 in FIG. 2. Output buffer 210 interfaces the output signals to format processor 108 for display. In this example each frequency bin is output for display at least once, excluding the lowest and the highest frequency bins, and each frequency bin excluding the two lowest and the two highest frequency bins is output for display twice.

Figure 7:
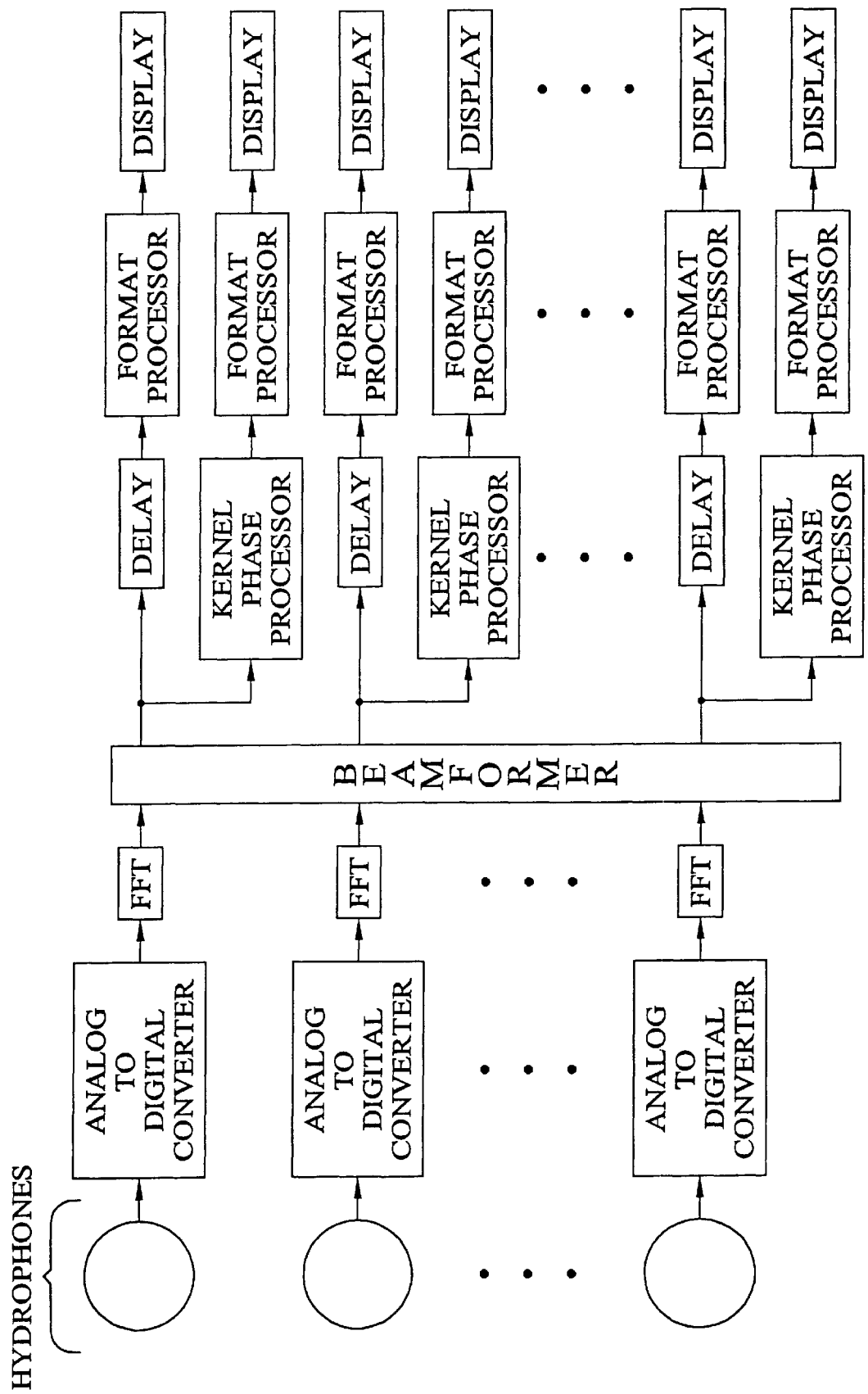
FIG. 7 is a block diagram of a beamformer application of the frequency domain kernel phase processor.

FIG. 7 illustrates an exemplary application of the frequency domain kernel phase processor with a frequency domain beamformer. Each beamformed output is processed in a similar fashion as the single sensor configuration described above.

Other modifications, variations, and applications of the present invention may be made in accordance with the above teachings other than as specifically described to practice the invention within the scope of the following claims.

We claim:

1. A frequency domain kernel phase processor comprising:

a scheduler for selecting samples from blocks of Fourier transform coefficients of an input signal, squaring magnitudes and calculating phase difference angles of said samples, and outputting said squared magnitudes and said phase difference angles as serial terms and parallel terms;

and a phase transform processor coupled to said scheduler for calculating a symmetric phase difference transform from said serial terms and said parallel terms to generate a frequency domain series representative of said input signal wherein relative signal power from interfering signals is substantially reduced.

2. The frequency domain kernel phase processor of claim 1 wherein said scheduler comprises:

a magnitude square function for calculating a magnitude square of each said selected sample;

a phase angle function for generating a phase angle for each said selected sample;

a symmetric phase function for generating a symmetric phase difference for each said phase angle;

a latch for outputting each said magnitude square and said symmetric phase difference as an ordered pair;

a shift register coupled to said latch;

a first clocked switch for selecting said ordered pairs in a sequence 1 and 4, 2 and 5, . . . N−3 and N+3;

and a second clocked switch for selecting said ordered pairs in a sequence 2 and 3, 3 and 4, . . . N−1 and N.

3. The frequency domain kernel phase processor of claim 1 wherein said transform processor comprises:

a phase difference transform function for finding a symmetric phase difference transform of said symmetric phase difference wherein said interfering signal has one of a linear phase wherein said symmetric phase difference has a mean value of substantially zero, a non-linear phase wherein said symmetric phase difference has a mean value of substantially $-\pi/2$, and a non-linear phase wherein said symmetric phase difference has a mean value of substantially $\pi/2$;

transform calculators coupled to said phase difference transform function for calculating phase products and phase difference products;

a first sum calculator coupled to said transform calculators for generating a sum of said phase products;

a second sum calculator coupled to said transform calculators for generating a sum of said phase difference products;

a divider for generating a quotient of said sum of phase products divided by said sum of phase difference products;

and a multiplier for generating a product of said quotient and said serial term to form said frequency domain series.

4. The frequency domain kernel phase processor of claim 1 wherein said selected samples each comprise a real value x and an imaginary value y and said phase angle is substantially $\theta$ such that $-\pi<\theta<\pi$ and $x+iy=(\sqrt{x^2+y^2})e^{-j\Theta}$.

5. The frequency domain kernel phase processor of claim 4 wherein said frequency domain series is generated substantially from the following formula:

$$f(\Delta\phi, \Delta\theta) = \left[\left(\Delta\theta + \frac{\pi}{2}\right)^2 - \left(\frac{\pi}{4}\right)^2\right]p_1(\Delta\phi) +$$

$$\left[(\Delta\theta)^2 - \left(\frac{\pi}{4}\right)^2\right]p_2(\Delta\phi) +$$

$$\left[\left(\Delta\theta - \frac{\pi}{2}\right)^2 - \left(\frac{\pi}{4}\right)^2\right]p_3(\Delta\phi)$$

where $$p_1(\Delta\phi) = e^{\frac{(\Delta\theta_j + \frac{\pi}{2})^2}{\frac{\pi^2}{4}}} e_1(\Delta\phi)$$

$$p_2(\Delta\phi) = e^{\frac{(\Delta\theta_j)^2}{\frac{\pi^2}{4}}} e_2(\Delta\phi)$$

$$p_3(\Delta\phi) = e^{\frac{(\Delta\theta_j - \frac{\pi}{2})^2}{\frac{\pi^2}{4}}} e_3(\Delta\phi)$$

and $$e_1(\Delta\phi) = \begin{cases} 1 & \text{if } -\pi \leq \Delta\phi < -\frac{\pi}{4} \\ 0 & \text{otherwise} \end{cases}$$

$$e_2(\Delta\phi) = \begin{cases} 1 & \text{if } -\frac{\pi}{4} \leq \Delta\phi \leq \frac{\pi}{4} \\ 0 & \text{otherwise} \end{cases}$$

$$e_3(\Delta\phi) = \begin{cases} 1 & \text{if } \frac{\pi}{4} < \Delta\phi \leq \pi \\ 0 & \text{otherwise} \end{cases}.$$

* * * * *